Figure 1:
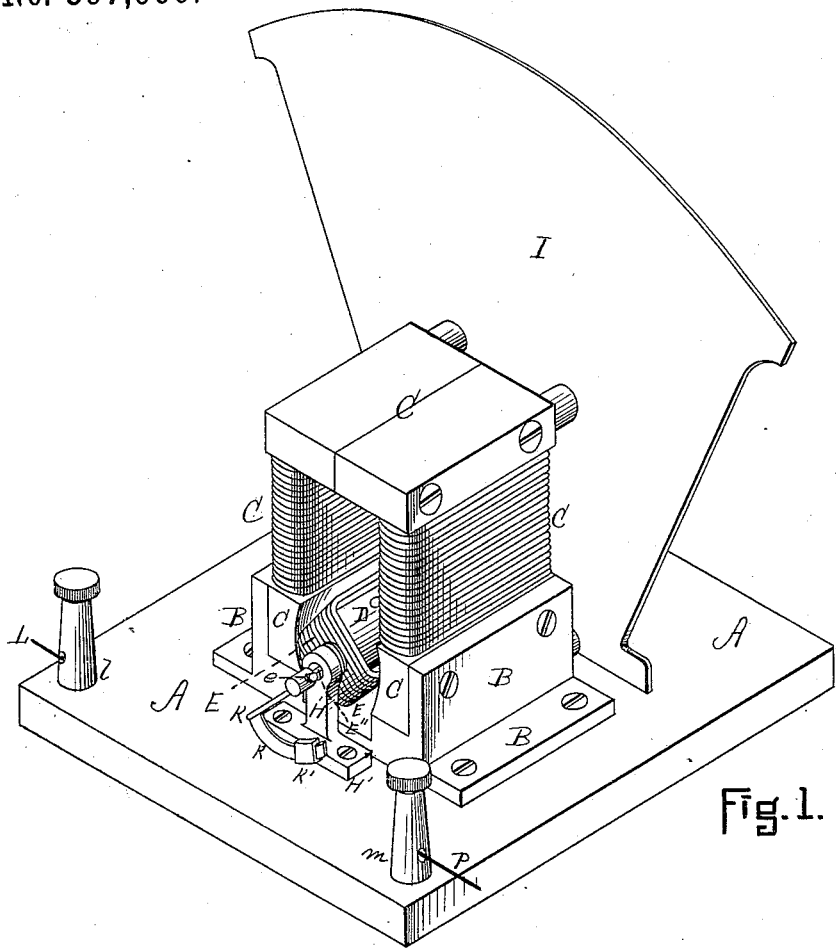

(No Model.) 2 Sheets—Sheet 1.

W. A. CAREY.
ELECTRIC CURRENT INDICATOR.

No. 397,966. Patented Feb. 19, 1889.

WITNESSES. INVENTOR.
J. M. Hartnett. William A. Carey
B. W. Williams By his Atty.
Henry Williams (No Model.) 2 Sheets—Sheet 2.

W. A. CAREY.
ELECTRIC CURRENT INDICATOR.

No. 397,966. Patented Feb. 19, 1889.

WITNESSES. INVENTOR.
William A Carey
By his Atty.

UNITED STATES PATENT OFFICE.

WILLIAM A. CAREY, OF MALDEN, MASSACHUSETTS.

ELECTRIC-CURRENT INDICATOR.

SPECIFICATION forming part of Letters Patent No. 397,966, dated February 19, 1889.

Application filed October 20, 1887. Serial No. 252,870. (No model.)

*To all whom it may concern:*

Be it known that I, WILLIAM A. CAREY, of Malden, in the county of Middlesex and State of Massachusetts, have invented new and useful Improvements in Instruments for Measuring Electrical Currents, of which the following is a specification.

My invention relates to ammeters or voltmeters for measuring the quantity or intensity of electrical currents, the device illustrated in the drawings being arranged as an ammeter.

All ammeters as at present constructed, as far as I am aware, require calibration at more or less frequent intervals in consequence of the falling off in the strength of the magnets forming a necessary part of them, thereby causing the figures on the dial to read falsely, owing to the well-known fact that as the magnet becomes weaker a greater electrical current must be opposed to it to force the index to a given point on the dial.

My invention has for one of its objects to provide an ammeter which will require no calibration. This I accomplish by means of the construction fully described below, such construction providing a magnet which is a magnet only at the moment of measuring the current, being substantially without magnetism when not actually subjected to the current of electricity to be measured.

Figure 2:
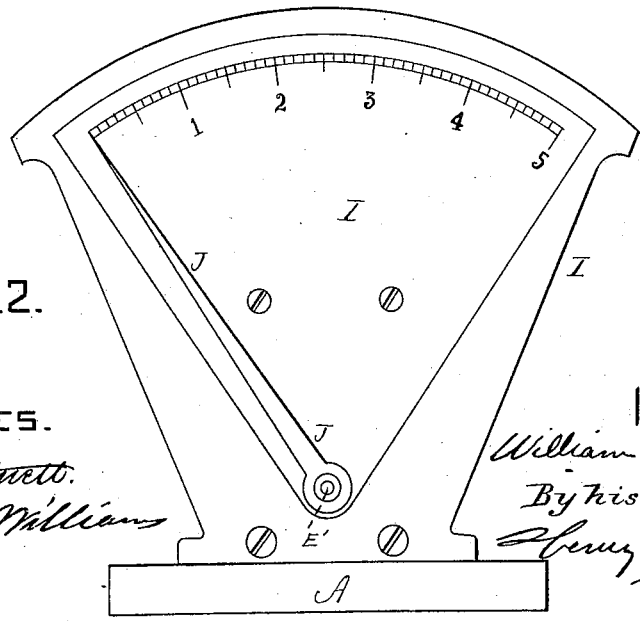
Figure 5:
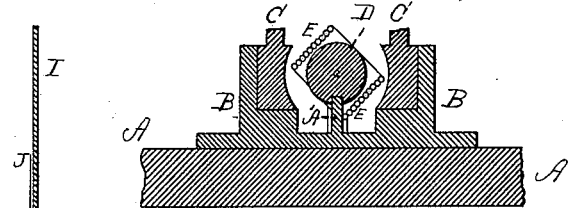
Figure 3:
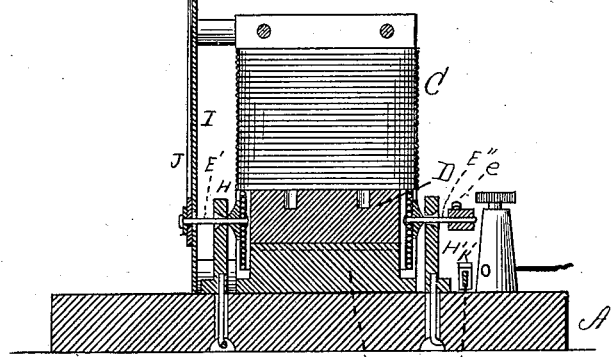
Figure 4:
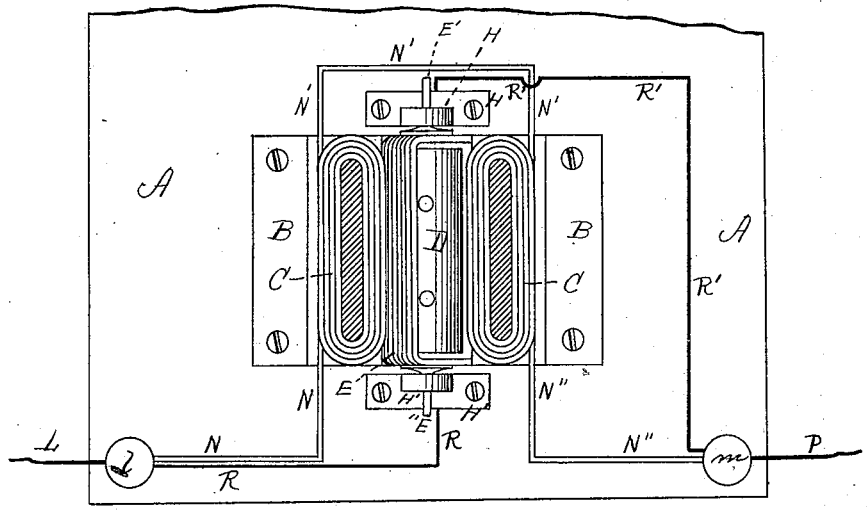

In the accompanying drawings, in which similar letters of reference indicate like parts, Figure 1 is a perspective view of my improved ammeter. Fig. 2 is a front elevation of the same. Fig. 3 is a central vertical section of the same. Fig. 4 is a diagrammatic view and horizontal section with the index-plate and weighted lever removed to illustrate the current. Fig. 5 is a cross vertical section or detail showing the movement of the pivoted armature below described.

A is the base, to which is fixed the brass frame B, which supports the electro-magnet C, of horseshoe form. Extending up centrally from the base A, midway between the poles of said magnet, is the brass support A', (see Figs. 3 and 5,) which sustains the core of soft iron, D.

E is an armature or coil of insulated wire, pivotally secured by means of the spindles E' E'' in the brass standards H H' and surrounding the core D, as shown.

I is an index-dial secured in the ordinary manner to the frame and magnet. The spindle E' has rigidly secured to it a pointer, J, and the opposite spindle, E'', is adjustably provided, by means of the set-screw e, with the arm K, weighted, (preferably adjustably,) as at K', so that by the action of gravity the arm hangs downward and the pointer stands normally at 0, the armature turning of course with the spindles as far as possible. (See Figs. 2, 4, and 5.) This is the position always assumed when the current is withdrawn. The current of electricity enters through the wire L and divides at *l*. (See Fig. 4.) A part passes through wire N, around the coils of the magnet C, by means of the wire N', thence through wire N'' to the point *m*, and completes the circuit through the wire P. The other part passes through the wire R, the standard H', the coil of wire E, the standard H, and the wire R' to the point *m* and completes the circuit through the wire P.

In operation, the lever K having been weighted and adjusted by comparison with a standard ammeter, a current of electricity is applied, which follows the course above described. The armature-coil E, which is in the position shown in Fig. 1, of course becomes a magnet, and, being placed between the poles and free to turn upon its axis, turns in accordance with a well-known law, and, being influenced by the power of the magnet and that of the weight K', indicates, by means of the spindle E and pointer J, the amount of the current on the dial I.

As the same amount of current will always produce the same magnetism in the instrument, it seems impossible that the instrument should vary, weaken, or require calibration. The influence of the current upon the armature-coil being always in the same direction, the ammeter is absolutely "dead beat."

It will be observed that this instrument is less susceptible to outside influences than those having permanent magnets.

In adapting the instrument to various strengths of current it is only necessary to change the weight on the lever and the reading of the index-dial, except in extreme cases, when larger or more wire and perhaps larger or smaller iron castings may be required, the principle remaining unchanged.

A spiral spring, being the mechanical equivalent of a weight, may be used in place thereof, if desired, a possible advantage being that the instrument may be used horizontally as well as vertically.

The simplicity and inexpensiveness of the instrument are apparent.

Having thus fully described my invention, what I claim, and desire to secure by Letters Patent, is—

The hereinbefore-described improved instrument for measuring electrical currents, consisting, essentially, of the electro-magnet C, support A', core D, and armature E, pivotally secured in the standards H H', spindle E', dial I, and pointer J, spindle E'', and weighted lever or arm K, bent into substantially the shape shown, said instrument being provided with suitable electrical connections and arranged and constructed substantially as and for the purpose set forth.

WILLIAM A. CAREY.

Witnesses:
HENRY W. WILLIAMS,
J. M. HARTNETT.